United States Patent [19]

McIntosh

[11] Patent Number: 4,605,292

[45] Date of Patent: Aug. 12, 1986

[54] MIRROR WITH ADHESIVE/MAGNETIC MIRROR SUPPORTING STRIPS

[75] Inventor: Edwin J. McIntosh, Summersville, W. Va.

[73] Assignee: Bright Of America, Inc., Greenbrier, W. Va.

[21] Appl. No.: 749,722

[22] Filed: Jun. 28, 1985

[51] Int. Cl.⁴ .............................................. G02B 7/18
[52] U.S. Cl. .................................... 350/641; 350/642; 350/631; 350/600; 350/590; 248/467; 248/206.5; 248/205.3; 248/309.4; 428/40; 428/900; 428/912.2
[58] Field of Search ............... 350/642, 641, 631, 600, 350/606, 590, 589, 582, DIG. 3; 248/467, 309.4, 206.5; 428/912.2, 900; 40/594, 600, 621; 296/84 B

[56] References Cited

U.S. PATENT DOCUMENTS

| | | | |
|---|---|---|---|
| 1,879,592 | 9/1932 | Thomas | 350/600 |
| 3,239,178 | 3/1966 | Pompa | 248/205.3 |
| 3,365,684 | 1/1968 | Stemke et al. | 248/206.5 |
| 3,464,752 | 9/1969 | Floelich | 248/309.4 |
| 3,827,020 | 7/1974 | Okamoto | 248/309.4 |
| 4,144,108 | 3/1979 | Gidley et al. | 428/900 |
| 4,287,676 | 9/1981 | Weinhaus | 248/206.5 |

FOREIGN PATENT DOCUMENTS

| | | | |
|---|---|---|---|
| 2114684 | 10/1972 | Fed. Rep. of Germany | 248/467 |
| 30010 | 7/1981 | Japan | 428/542.2 |
| 21707 | 2/1983 | Japan | 350/631 |
| 1268110 | 3/1972 | United Kingdom | 296/84 B |

Primary Examiner—Jon W. Henry
Attorney, Agent, or Firm—Diller, Ramik & Wight

[57] ABSTRACT

A mirror formed from a generally sheet-like unbreakable body having opposite surfaces, one of the surfaces being a reflective surface, a first removable transparent protective sheet covering and protecting the reflective surface, a magnetic adhesively bonded to a second of the surfaces whereby the mirror can be removably attached to magnetically attractive support surfaces, and a strip of double-faced pressure-sensitive tape adhered to the magnetic but removable therefrom whereby the mirror can be adhesively secured to a non-magnetically attractive support surface.

7 Claims, 5 Drawing Figures

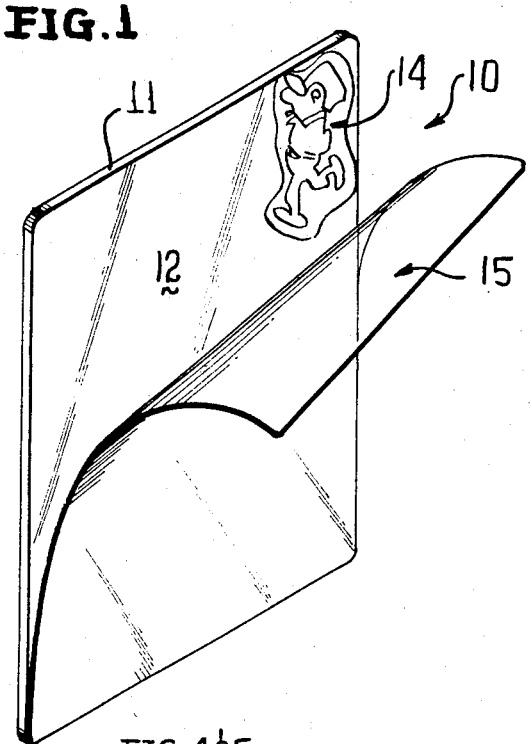
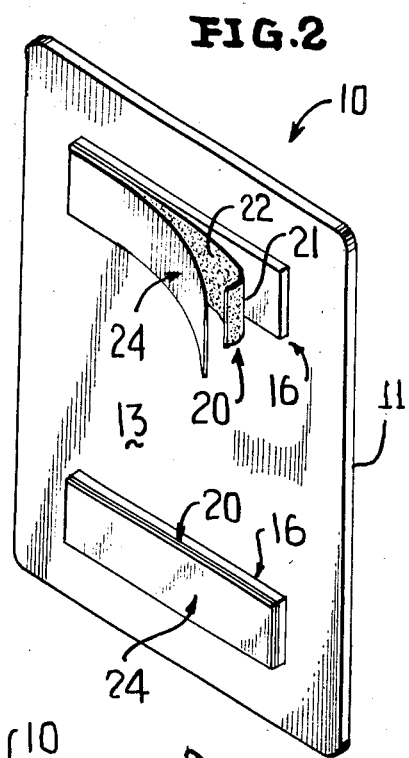
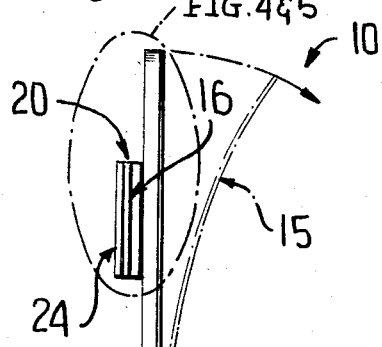
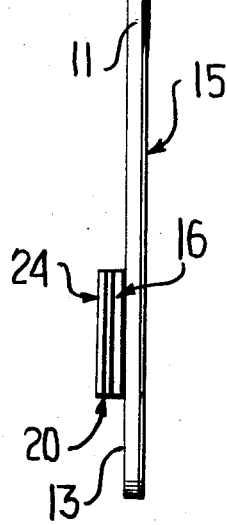
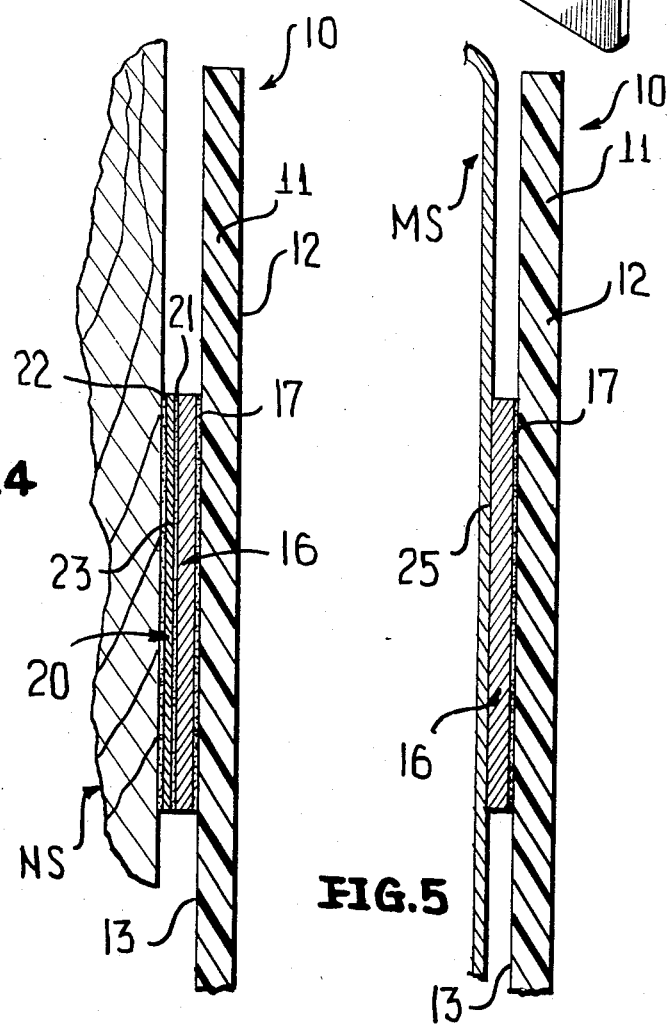

MIRROR WITH ADHESIVE/MAGNETIC MIRROR SUPPORTING STRIPS

The present invention is directed to a novel mirror formed from a generally sheet-like unbreakable body having opposite surfaces of which one is reflective and the other carries a magnet, a first removable transparent protective sheet covers the reflective surface, a magnet is adhered to a second of the surfaces whereby the mirror can be removably attached to magnetically-attractive support surfaces, a strip of tape having pressure-sensitive adhesive coatings upon opposite sides thereof, a first of the adhesive coatings bonding the strip of tape to the magnet, a second removable protective sheet covering a second of the adhesive coatings whereby the mirror can not be adhesively secured to a monmagnetically-attractive support surface until the second removable protective sheet has been removed, and the bond strength and adhesive affinity of the first adhesive coating is such as to generally cleanly separate along an interface between the magnet and the first adhesive coating when the strip of tape is separated from the magnet whereby the mirror can be selectively held by the magnet with the strip of tape still attached thereto upon a magnetically-attractive surface, yet with the second protective sheet removed, the adhesive strip will hold the mirror to a nonmagnetically-attractive support surface.

Still another object of this invention is to provide a novel mirror as aforesaid including means for defining visible indicia upon the reflective surface which is additionally protected by and is visible through the first removable transparent protective sheet.

Still another object of this invention is to provide a novel mirror of the type set forth heretofore wherein the sheet-like unbreakable body is acrylic, and there are two magnets and two strips of tape disposed in generally parallel relationship to each other upon the sheet-like body.

With the above and other objects in view that will hereinafter appear, the nature of the invention will be more clearly understood by reference to the following detailed description, the appended claims and the several views illustrated in the accompanying drawings.

FIG. 1 is a front perspective view of a novel mirror constructed in accordance with this invention, and illustrates a sheet-like body, a reflective surface thereof, a decal upon the reflective surface, and a transparent protective covering sheet partially removed from the reflective surface.

FIG. 2 is a rear perspective view of the mirror, and illustrates two magnets each carrying a strip having pressure-sensitive adhesive coatings on opposite surfaces thereof.

FIG. 3 is a side elevational view of the mirror, and illustrates the magnets, the adhesive strips, and a protective strip associated with each.

FIG. 4 is an enlarged fragmentary sectional view of the encircled portion of the mirror of FIG. 3, and illustrates the mirror adhered by the pressure-sensitive adhesive tape to a nonmagnetically-attractive surface.

FIG. 5 is an enlarged fragmentary sectional view of the encircled portion of FIG. 3, and illustrates the mirror secured to a magnetically-attractive surface by one of the two magnets.

A novel mirror constructed in accordance with this invention is illustrated in the drawings and is generally designated by the reference numeral 10.

The mirror 10 is specifically designed and constructed to be attached to and supported by a monmagnetically-attractive support surface NS (FIG. 4), such as wood, wallboard, plasterboard or the like or to be secured to a magnetically-attractive support surface MS (FIG. 5), such as a steel cabinet, door, wall or the like. The mirror 10 is formed as a generally sheet-like unbreakable body 11 of a square or rectangular configuration. The sheet-like body 11 is preferably constructed from plastic material, such as acrylic, and includes a reflective surface 12 and an opposite rear unreflective surface 13.

Means generally designated by the reference numeral 14 is provided in the form of a decal which defines visible indicia upon the reflective surface 12. The indicia 14 can vary as desired, but both the indicia/decal 14 and the reflective surface 12 are protected by a first removable and transparent protective sheet or covering 15.

Two identical magnets or means for securing the mirror 10 to the magnetically-attractive surface MS are attached to the rear surface 13 of the body 11 and are each identically designated by the reference numeral 16. The magnets 16, 16 are simply strips which are bonded by an adhesive or adhesive coating 17 (FIGS. 4 and 5) to the rear surface 13 of the mirror body 11. The strips 16 are generally in spaced parallel relationship to each other, as is most readily apparent in FIGS. 2 and 3 of the drawing.

An identical strip of tape 20, 20 having pressure-sensitive adhesive coatings 21, 22 on opposite surfaces of a carrier strip 23 thereof is secured by the adhesive coating 21 to each of the magnets 16. In this manner the adhesive coating 21 secures each strip 20 to its associated magnet 16.

A second removable protective sheet 24 (FIGS. 2 and 3) is adhered to the adhesive coating 22 of each of the strips 20.

When the mirror 10 is to be secured to a nonmagnetically-attractive supporting surface NS (FIG. 4), each of the protective sheets or covering 24, 24 is removed and the adhesive 22 simply adheres the mirror 10 to the nonmagnetically-attractive surface NS, as is readily apparent from FIG. 4. However, if it is desired to secure the mirror 10 to a magnetically-attractive supportive surface (MS of FIG. 5), the strips 20 are removed along the adhesive coating 21 which has a bond strength and an adhesive affinity such as to generally cleanly separate along an interface (unnumbered) between each magnet 16 and its associated coating 21, thereby exposing a clean surface 25 (FIG. 5) of each magnet 16. Thus, the surface 25 is in intimate engagement with the magnetically attractive surface MS and is held thereto by the magnets 16, 16.

In the foregoing manner, the mirror 10 can be selectively applied to either nonmagnetically-attractive surfaces (NS), as will be apparent in FIG. 4, or to magnetically-attractive surfaces (MS), as is readily apparent from FIG. 5.

Variations and equivalents are, of course, within the scope of this invention and include utilizing the mirror 10 by securing the same to a magnetically attractive surface MS without removing the strips 20 or the protective sheet 24 from each of the magnets 16. In this case the protective sheet 24 will still protectively overly the adhesive coating 22 and will contact the magnetically attractive surface MS not shown. In this case the attractive forces of the magnetic 16 must, of course, be sufficiently strong to hold the mirror 10 to the magnetically-attractive surface MS through the adhesive coatings 21, 22, the strip 20 and each protective sheet 24 thereupon.

Although in a preferred embodiment of the invention as has been specifically illustrated and described herein, it is to be understood that minor variations may be made in the apparatus without departing from the spirit and scope of the invention, as defined in the appended claims.

What is claimed is:

1. A mirror comprising a generally sheet-like unbreakable body having opposite surfaces, one of said surfaces being a reflective surface, a first removable transparent protective sheet covering and protecting said reflective surface, means for securing a magnet to a second of said surfaces whereby said mirror can be removably attached to magnetically-attractive support surfaces, a strip of tape having pressure-sensitive adhesive coatings upon opposite sides thereof, a first of said adhesive coatings bonding said strip of tape to said magnet, a second removable protective sheet covering a second of said adhesive coatings whereby said mirror can not be adhesively secured to a nonmagnetically-attractive support surface until said second removable protective sheet has been removed, and the bond strength and adhesive affinity of said first adhesive coating is such as to generally cleanly separate along an interface between said magnet and said first adhesive coating when said strip of tape is separated from said magnet.

2. The mirror as defined in claim 1 including means for defining visible indicia upon said reflective surface which is additionally protected by and is visible through said first removable transparent protective sheet.

3. The mirror as defined in claim 1 including second means for securing a second magnet to said second surface in generally spaced relationship to first-mentioned magnet, a second strip of tape having pressure-sensitive adhesive coatings upon opposite sides thereof, a first of said last-mentioned adhesive coatings bonding said seconds strip of tape to said magnet, a third removable protective sheet covering a second of said last-mentioned adhesive coatings whereby said mirror can not be adhesively secured to a nonmagnetically-attractive support surface until said third removable protective sheet has been removed, and the bond strength and adhesive affinity of said last-mentioned first adhesive coating is such as to generally cleanly separate along an interface between said second magnet and said last-mentioned first adhesive coating when said second strip of tape is separated from said second magnet.

4. The mirror as defined in claim 1 wherein said sheet-like unbreakable body is acrylic.

5. The mirror as defined in claim 3 including means for defining visible indicia upon said reflective surface which is additionally protected by and is visible through said first removable transparent protective sheet.

6. The mirror as defined in claim 3 wherein said first-mentioned and second magnets are disposed in generally parallel relationship.

7. The mirror as defined in claim 5 wherein said first-mentioned and second magnets are disposed in generally parallel relationship.

* * * * *